(12) United States Patent
Clymer et al.

(10) Patent No.: US 12,045,893 B2
(45) Date of Patent: Jul. 23, 2024

(54) METHOD AND SYSTEM FOR EARLY IDENTIFICATION AND SETTLEMENT OF TOTAL LOSS CLAIMS

(71) Applicant: State Farm Mutual Automobile Insurance Company, Bloomington, IL (US)

(72) Inventors: Carlee A. Clymer, Atlanta, GA (US); Gary Foreman, Bloomington, IL (US); Ronald R. Duehr, Normal, IL (US); Denson Smith, Niceville, FL (US); Vincent M. Hummel, Roanoke, IL (US); Bradley J Walder, Congerville, IL (US); Chad Mychal Hirst, Eureka, IL (US); Justin Devore, Atlanta, IL (US); Shane Tomlinson, Bloomington, IL (US); David A Pluimer, Zionsville, IN (US); Pavan Kumar Bhagavatula, Normal, IL (US); John Westhues, Normal, IL (US); Tracey Leigh Knorr, Colfax, IL (US); Erin E. Miller, Bloomington, IL (US); Joshua T. Monk, Bloomington, IL (US); Aaron Ames, Mesa, AZ (US); John G. McConkey, Bloomington, IL (US); Michael Cicilio Fresquez, Cumming, GA (US); Himanshu Chhita, Lawrenceville, GA (US); Jason Beckman, Bloomington, IL (US); Douglas A. Graff, Mountain View, MO (US); Michele Wittman, Bloomington, IL (US); Alexis Cates, Sherman, IL (US); Stephen Young, Cumming, GA (US); Rajesh Panicker, Bloomington, IL (US); Yohan Santos, Cumming, GA (US); Stephen Wilson, LeRoy, IL (US); Carrie A Read, Bloomington, IL (US); Michael Brown, Normal, IL (US); Robin A Rose, Normal, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 20 days.

(21) Appl. No.: 18/091,702

(22) Filed: Dec. 30, 2022

(65) Prior Publication Data

US 2023/0135121 A1    May 4, 2023

Related U.S. Application Data

(63) Continuation of application No. 16/593,355, filed on Oct. 4, 2019, now Pat. No. 11,574,366.

(Continued)

(51) Int. Cl.
*G06Q 40/00* (2023.01)
*G06N 7/01* (2023.01)
(Continued)

(52) U.S. Cl.
CPC ........... *G06Q 40/08* (2013.01); *G06N 7/01* (2023.01); *G07C 5/0808* (2013.01); *G07C 5/0841* (2013.01)

(58) Field of Classification Search
CPC .......... G06Q 40/08; G06N 7/01; G06N 20/00; G07C 5/0808; G07C 5/0841
(Continued)

(56) References Cited

U.S. PATENT DOCUMENTS

| | | | | |
|---|---|---|---|---|
| 6,470,303 B2* | 10/2002 | Kidd | ..................... | G06Q 99/00 715/764 |
| 7,502,772 B2* | 3/2009 | Kidd | ..................... | G06N 5/025 704/1 |

(Continued)

FOREIGN PATENT DOCUMENTS

CN     110570389 A     12/2019

OTHER PUBLICATIONS

Profiling Driver Behavior for Personalized Insurance Pricing and Maximal Profit; 2018 IEEE International Conference on Big Data ( Big Data) (pp. 1387-1396); Bing He, Dian Zhang, Siyuan Liu, Hao Liu, Dawei Han, Lionel M. Ni; Dec. 10, 2018. (Year: 2018).*

(Continued)

*Primary Examiner* — Tien C Nguyen
(74) *Attorney, Agent, or Firm* — Lee & Hayes, P.C.

(57) ABSTRACT

A method of identifying a vehicle total loss claim includes retrieving a plurality of historical vehicle records, labeling the records as repaired or total loss, calculating mean cost (Continued)

values, training a regression model, optimizing a probability threshold, analyzing a plurality of inputs to generate a prediction, and transmitting the prediction. A computing system includes a transceiver; a processor; and a memory storing instructions that, when executed by the processor, cause the computing system to receive answers, transmit the answers, receive a prediction, when the prediction is repairable, generate a repair suggestion, and when the prediction is total loss, generate a settlement offer. A non-transitory computer readable medium containing program instructions that when executed, cause a computer to receive answers, transmit the answers, receive a prediction, when the prediction is repairable, generate a repair suggestion, and when prediction is total loss, generate a settlement offer.

20 Claims, 3 Drawing Sheets

Related U.S. Application Data

(60) Provisional application No. 62/835,176, filed on Apr. 17, 2019.

(51) Int. Cl.
*G06Q 40/08* (2012.01)
*G07C 5/08* (2006.01)

(58) Field of Classification Search
USPC ...... 705/4, 5, 26.1, 40, 45, 38, 39, 71, 7.29; 709/224, 226; 713/170; 726/25; 715/764, 810; 704/1; 707/706, 769; 373/76; 719/313; 348/144; 235/378, 235/380; 455/433
See application file for complete search history.

(56) References Cited

U.S. PATENT DOCUMENTS

| | | | | |
|---|---|---|---|---|
| 8,095,391 B2* | 1/2012 | Obora | ................... | G06Q 10/10 |
| | | | | 705/1.1 |
| 8,731,977 B1* | 5/2014 | Hardin | ................... | G06Q 40/08 |
| | | | | 705/26.1 |
| 9,218,626 B1* | 12/2015 | Haller, Jr. | ........... | G06Q 10/0875 |
| 10,319,094 B1* | 6/2019 | Chen | ........................ | G06N 3/08 |
| 10,453,142 B2* | 10/2019 | Mun | ....................... | G06Q 40/08 |
| 10,580,075 B1* | 3/2020 | Brandmaier | ........... | G06Q 40/08 |
| 10,740,891 B1* | 8/2020 | Chen | ..................... | G06T 7/0008 |
| 11,157,973 B2* | 10/2021 | Fuchs | ................. | G06Q 30/0283 |
| 2011/0276396 A1* | 11/2011 | Rathod | .............. | G06Q 30/0282 |
| | | | | 707/706 |
| 2015/0149218 A1* | 5/2015 | Bayley | ................ | B60R 21/0136 |
| | | | | 705/4 |
| 2015/0213556 A1* | 7/2015 | Haller, Jr. | .............. | G06Q 40/08 |
| | | | | 705/4 |
| 2017/0148102 A1* | 5/2017 | Franke | ............... | G06Q 30/0601 |
| 2018/0260793 A1* | 9/2018 | Li | .......................... | G06Q 40/08 |
| 2019/0072968 A1* | 3/2019 | Will, IV | .............. | G08G 1/0112 |
| 2019/0213804 A1 | 7/2019 | Zhang et al. | | |
| 2019/0311301 A1 | 10/2019 | Pyati | | |
| 2020/0210786 A1 | 7/2020 | Xu | | |
| 2021/0291817 A1* | 9/2021 | Tofte | .................. | G06Q 30/0201 |

OTHER PUBLICATIONS

Office Action for U.S. Appl. No. 16/593,355, mailed on Apr. 15, 2021, Clymer, "Method and System for Early Identification and Settlement of Total Loss Claims", 44 Pages.

Non Final Office Action dated Oct. 14, 2020 for U.S. Appl. No. 16/593,355, "Method and System for Early Identification and Settlement of Toal Loss Claims", Clymer, 33 pages.

Office Action for U.S. Appl. No. 16/593,355, mailed on Nov. 26, 2021, Clymer, "Method and System for Early Identification and Settlement of Total Loss Claims", 36 Pages.

Office Action for U.S. Appl. No. 16/593,355, mailed on Mar. 31, 2022, Clymer, "Method and System for Early Identification and Settlement of Total Loss Claims", 33 Pages.

Parikh, et al., "Understanding and Using Sensitivity, Specificity, and Predictive Values", Indian Journal of Ophthalmology, Jul. 31, 2007, 18 pages.

Richard et al. , "A Tale of Two Cities: Analyzing Road Accidents with Big Spatial Data", 2017 ISSS International Conference on Big Data, pp. 3461-pp. 3470.

* cited by examiner

METHOD AND SYSTEM FOR EARLY IDENTIFICATION AND SETTLEMENT OF TOTAL LOSS CLAIMS

CROSS-REFERENCE TO RELATED APPLICATION

This application is a continuation of, and claims the benefit of, U.S. patent application Ser. No. 16/593,355, filed on Oct. 4, 2019, and entitled "Method and System for Early Identification and Settlement of Total Loss Claims, which claims priority to U.S. Provisional Patent Application No. 62/835,176, filed Apr. 17, 2019. Each of U.S. patent application Ser. No. 16/593,355, and U.S. Provisional Patent Application No. 62/835,176 are incorporated by reference herein in their entity for all purposes.

FIELD OF THE DISCLOSURE

The present invention generally relates to methods and systems for early identification of vehicle total loss claims, and more particularly, to predicting whether a vehicle loss claim represents a total loss by training a logistic regression model and providing an automated settlement.

BACKGROUND

An insurer (e.g., a property and casualty carrier) considers a vehicle claim to be a total loss claim when the cost of repairing the vehicle associated with the claim exceeds the actual cash value (ACV) of the vehicle. Existing techniques for identifying total loss require a time-consuming and lengthy process and suffer from other significant drawbacks.

First, existing techniques for identifying total loss may require manual inspection. Conventionally, an insured (e.g., a policy holder) reports a vehicle claim to the insured's insurer, and then schedules an appointment with a claims adjuster and/or appraiser. Typically, the claims adjuster inspects the vehicle in person and determines whether the vehicle is a total loss based on the inspection. The adjuster's analysis may take days or sometimes even weeks to be finalized, subject to the adjuster's backlog, schedule, etc. An adjuster's analysis may cost hundreds of dollars per vehicle. For example, the claims adjusting process may take as much as one week to complete post-inspection. However, recent marketing research conducted by J. D. Power indicates that claimants expect to receive a settlement offer within three days of a first notice of loss (FNOL). Therefore, the time-consuming and lengthy process of identifying total loss causes customer/claimant frustration and may have a negative impact on customer retention.

Second, existing approaches to predicting total loss are often inaccurate and require an adjuster/appraiser to perform additional confirmation inspections. Inaccurate and/or duplicative vehicle repairability predictions can have a negative impact on customer perception and increase claim cycle time.

Third, vehicle repairability options are not personalized to customer circumstances, which leads to unnecessary customer frustration. For example, a customer may be notified that a repair is necessary, but may not be provided with any information regarding the type of repair needed, or the most cost-effective repair provider.

Fourth, existing total loss prediction techniques may not be applied to vehicles that are drivable. As a result, some vehicles that are a total loss but are still drivable are not identified, and drivable vehicle data is not made available for further analysis.

Fifth, existing techniques do not provide the customer with an initial communication outlining the total loss or repair process, or communication throughout the process to keep the customer updated as to the progress of the claim.

Sixth, existing techniques are not optimized for total loss prediction. For example, existing techniques may be specifically designed to optimize other factors (e.g., to route vehicles faster to save on storage costs incurred from tow yards).

Seventh, existing techniques may rely on insured or claimant photos to avoid the need for physical inspection of the vehicle. However, in practice, around 25% of all vehicle claims relate to a vehicle that is non-drivable. In these cases, the customer might not be with the vehicle at the time the customer provides the insurer with the FNOL. Moreover, photograph-based total loss prediction requires the customer/claimant to engage with a digital channel which some customers seek to avoid.

Therefore, techniques are needed for expeditiously and correctly identifying total loss, without requiring a physical inspection of the vehicle by an adjuster.

BRIEF SUMMARY

In one aspect, a method of identifying a vehicle total loss claim of a customer includes retrieving a plurality of historical vehicle records each including a respective set of cause of loss codes and a salvage disposition; labeling, based on the respective set of cause of loss codes and the salvage disposition, each of the plurality of historical vehicle records as either repaired or total loss; calculating mean cost values for true positive, false positive, true negative, and false negative with respect to each of the plurality of historical vehicle records, training a cost-sensitive regression model by analyzing the labeled historical vehicle records and respective mean cost values; optimizing a cost-minimized probability threshold with respect to the cost-sensitive regression model; analyzing a plurality of test data answers using the regression model to generate a vehicle total loss prediction; and transmitting an indication of the vehicle total loss prediction.

In another aspect, a computing system for training and operating dynamic vehicle assessment models includes a transceiver; one or more processors; and one or more memories storing instructions. When the instructions are executed by the one or more processors, the instructions cause the computing system to (a) receive, in an insurer computing system, one or more test data answers of a customer, (b) transmit, via a dynamic vehicle assessment model application programming interface, the one or more test data answers of the customer, (c) receive, from the dynamic vehicle assessment model application programming interface, an indication of a vehicle total loss prediction, (d) when the indication of the vehicle total loss prediction is repairable, generate a personalized repair suggestion, and (e) when the indication of the vehicle total loss prediction is total loss, generate a settlement offer.

In yet another aspect, a non-transitory computer readable medium containing program instructions is provided. When the instructions are executed, the instructions cause a computer to (a) receive, in an insurer computing system, one or more test data answers of a customer, (b) transmit, via a dynamic vehicle assessment model application programming interface, the one or more test data answers of the customer, (c) receive, from the dynamic vehicle assessment model application programming interface, an indication of a vehicle total loss prediction, wherein the indication of the vehicle total loss prediction is generated by a cost-sensitive regression model having a cost-minimized probability threshold, (d) when the indication of the vehicle total loss prediction is repairable, generate a personalized repair suggestion, and (e) when the indication of the vehicle total loss prediction is total loss, generate a settlement offer.

DETAILED DESCRIPTION

Overview

The embodiments described herein relate to, inter alia, methods and systems for early identification of vehicle total loss claims, and more particularly, to predicting whether a vehicle (e.g., a passenger vehicle, a motorcycle, a tractor trailer, etc.) loss claim represents a total loss by training a machine learning (ML) model using enterprise claim system (ECS) data. ECS data may include historical insurance claims data, including inspection data and billing data, vehicle telematics data, and total loss settlement tool history. In some embodiments, a training module may label vehicles associated with insurance claims as repairable and/or total loss based on one or more cause of loss codes, a cause of loss status, a salvage disposition type code, a salvage status code, and/or other ECS data. The labeled data may be used to train an ML model capable of classifying vehicles into a plurality of vehicle states (e.g., repairable, total loss, unknown, etc.), wherein the classification is based on the trained ML model analyzing a plurality of test data questions (e.g., vehicle age, vehicle age squared, whether the vehicle rolled over, etc.). An insurer may used the trained ML model in conjunction with additional computerized elements (e.g., a loss reporting application, a claims management platform, etc.) to provide the insurer's customers with an expedited total loss analysis. In some embodiments, the ML model may be known as a dynamic vehicle assessment model (DVAM).

The present expedited total loss techniques provide qualified insured customers/claimants with the option to settle a claim as a total loss without requiring a physical inspection. Early identification of total loss vehicles significantly reduces costs associated with misrouted vehicles and improves the cycle times for insurance claims. For example, recent testing of the techniques disclosed herein has demonstrated an average reduction in claim cycle time of six to ten days from FNOL to issuance of first payment. Such drastic reductions in processing time strongly influence customer satisfaction and improve retention. The personalized repair options available to customers as a result of the present techniques drive improvements to the overall customer experience, and further increase customer retention. Still further, improving the accuracy of identifying total losses (either by correctly identifying true positives and/or reducing false positives) benefits the routing and handling of repairable non-drivable vehicles. For example, vehicles misrouted to a salvage yard or repair shop must be towed a second time. Predicting total losses and probable repairs for all vehicles with greater accuracy results in cost savings for unnecessary tows, a reduction of unnecessary staff inspections, and a reduction of overall claim cycle time. The present techniques also provide an indirect benefit of improved dashboard reporting of the accuracy of total loss predictions.

Figure 1:
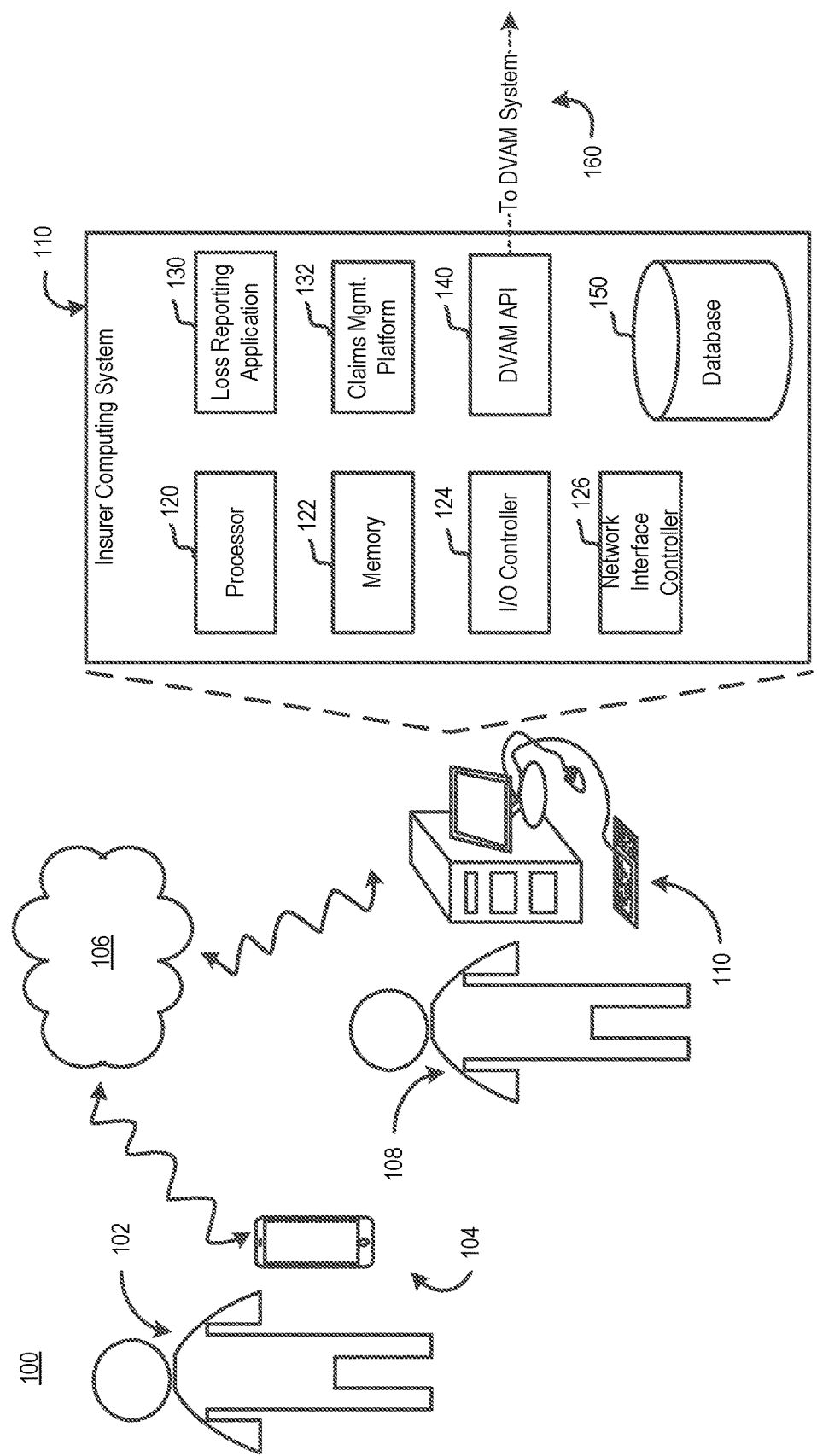
FIG. 1 depicts an example computing environment for early identification of total loss vehicle claims.

Example Computing Environment for Early Identification of Vehicle Total Loss Claims FIG. 1 depicts an example computing environment 100 for early identification of vehicle total loss claims. FIG. 1 includes a customer 102, a customer computing device 104, a network 106, an insurer employee 108, and an insurer computing system 110.

The customer 102 may be an insured of an automobile and/or other insurance policy. The customer 102 may be a claimant in that the customer 102 uses the environment 100 to file a claim under one or more insurance policies belonging to the customer 102. Of course, in some cases, the customer 102 may be a spouse, representative, and/or agent of an insured filing a claim on the insured's behalf. The customer 102 may use the computing device 104 to file the claim.

The computing device 104 may be any suitable computing device, such as a mobile computing device (e.g., a smart phone, a tablet, a laptop computer, a desktop computer, a wearable device, etc.). The computing device 104 may be communicatively coupled to the network 106, thereby facilitating access of the customer 102 to other computing systems, such as the insurer computing system 110, via the network 106.

The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G) connection to a mobile computing device of a user (e.g., the computing device 104) and an IEEE 802.11 connection to the mobile computing device. In general, the network 106 facilitates bidirectional electronic communication between the customer 102 (via the computing device 104) and the insurer employee 108 (via the insurer computing system 110).

The insurer may task the insurer employee 108 with assisting the customer 102 in the claims filing process. For example, the insurer employee 108 may receive a telephone call from the customer 102, collect data relating to the insurance claim of the customer 102, and enter the data into a loss reporting application of the insurer computing system 110.

The insurer computing system 110 may be implemented as one or more servers, in some embodiments. The one or more servers may be communicatively coupled via the computer network 106. While referred to herein as a "server," any/all of the servers implemented in the computing environment 100 may, in some implementations, include multiple servers and/or other computing devices. Moreover, the server or servers may include multiple servers and/or other computing devices distributed over a large geographic area (e.g., including devices at one or more data centers), and any of the operations, computations, etc., described below may be performed by remote computing devices in a distributed manner. In some embodiments, the insurer computing system 110 may be implemented as virtual servers (e.g., cloud-based virtual machines), Docker instances, etc.

The insurer computing system 110 may include a processor 120, a memory 122, an input/output (I/O) controller 124, a network interface controller (NIC) 126, a loss reporting application 130, a claims management platform module 132, a DVAM application programming interface (API) 140, and a database 150.

The processor 120 may be a single processor (e.g., a central processing unit (CPU)), or may include a set of processors (e.g., a CPU and a graphics processing unit (GPU)).

The memory 122 may be a computer-readable, non-transitory storage unit or device, or collection of units/devices, that includes persistent (e.g., hard disk) and/or non-persistent memory components. The memory 122 may store instructions that are executable on the processor 120 to perform various operations, including the instructions of various software applications and data generated and/or used by such applications. In the example implementation of FIG. 1, the memory 122 may store, for example, the loss reporting application 130, the claims management platform module 132, and the DVAM API 140. As noted above, the components of the environment 100 may be implemented using multiple servers. Therefore, any one (or more) of the modules depicted in FIG. 1 may be located in the memory 122 of a remote computing device. For example in some embodiments, the loss reporting application 130 may reside in the memory of the customer computing device 104. In such an embodiment, the collection of claim data may be fully automated (e.g., being performed by the computing device 104), and such an embodiment may not include the insurer employee 108.

The I/O controller 124 includes hardware, firmware and/or software configured to enable a user to interact with (i.e., both provide inputs to and perceive outputs of) the insurer computing system 110. For example, the I/O controller 124 may be coupled to a touchscreen with both display and manual input capabilities. Alternatively, or in addition, the I/O controller may be coupled to a keyboard for accepting user inputs, and/or a microphone (with associated processing components) that provides voice control/input capabilities to the user. In some embodiments, multiple servers in the computing environment 100 may include multiple respectively different implementations of the I/O controller 124.

The NIC 126 includes hardware, firmware and/or software configured to enable the insurer computing system 110 to exchange (e.g., send to and receive from) electronic data with other computing systems (e.g., other systems/servers accessible via the network 106 such as the customer computing device 104). For example, the NIC 126 may include a wired transceiver, a cellular communication transceiver, a WiFi transceiver, and/or transceivers for one or more other wireless communication technologies (e.g., 4G).

As noted above, the modules included in the insurer computing system 110 may include the loss reporting application module 130, the claims management platform module 132, and the DVAM API 140. Each module may be implemented using a set of computer-executable instructions stored in the memory 122.

Figure 2:
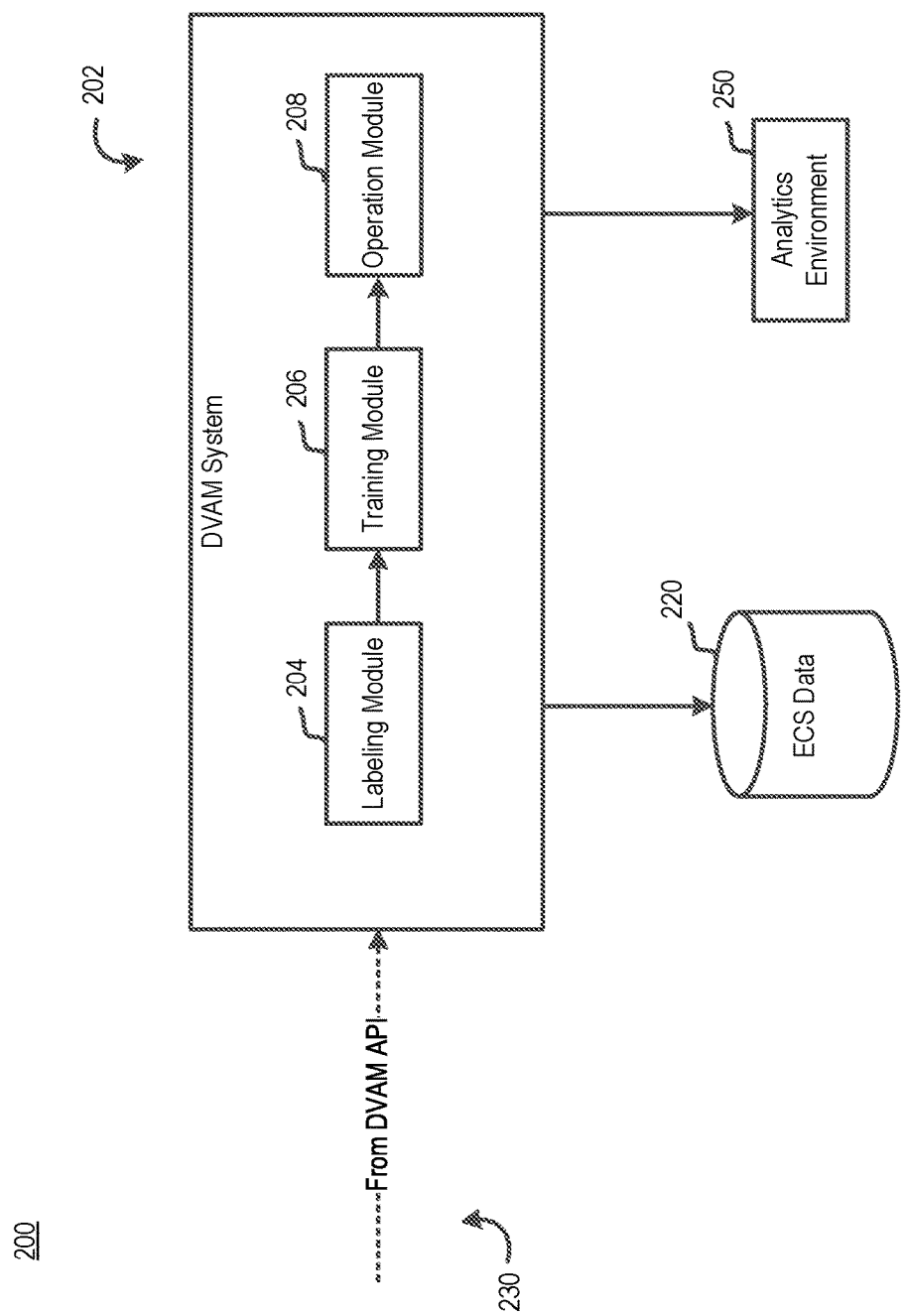
FIG. 2 depicts an example computing system for using machine learning to identify total loss vehicle claims.

Generally, the loss reporting application 130 collects user loss information (e.g., answers to test data questions), calls the DVAM API 140, and submits loss reports to the claims management platform 132. In some embodiments, the loss reporting application 130 collects a free-form textual narrative explanation of the damage to the vehicle and/or a photograph of the damage to the vehicle. The claims management platform 132 determines whether to settle claims, based on a vehicle disposition generated by the DVAM API 140. The DVAM API 140 may be entirely contained in the insurer computing system 110. In some embodiments the insurer computing system 100 may include a set of programming language bindings for accessing a DVAM system, as depicted in FIG. 2. In other words, the DVAM API 140 may include model resources, and/or an API linkage 160 for accessing those resources remotely. Specifically, the DVAM API 140 may submit API requests to a DVAM system via an API link 160, and may receive API responses from the DVAM system via the API link 160. The DVAM system and model resources are discussed further below.

The loss reporting application 130 and the claims management platform 132 may access the database 150 to store and retrieve information. The database 150 may be any suitable database (e.g., a structured query language (SQL) database, a flat file database, a key/value data store, etc.). The database 150 may include a plurality of database tables for storing data according to data storage schema. The database 150 may include relational linkages between tables, and may allow complex data types such as time series data to be stored and queried.

In operation, the customer 102 suffers a loss to a covered vehicle. In an embodiment, the customer 102 contacts the insurer (e.g., by telephone, email, web chat, etc.) wherein the insurer employee 108 requests a set of answers corresponding to test data questions. The test data questions may include: the age of the vehicle; the vehicle age squared; whether the vehicle rolled over; whether the vehicle was flooded; whether the vehicle was burned; whether the vehicle had wheel or suspension damage, whether the vehicle suffered a frontal impact; whether any of the vehicle's doors were jammed open or shut; whether the vehicle's engine was disabled; whether any of the vehicle's airbags deployed, etc.

In an embodiment, the insurer employee 108 may enter the set of answers on behalf of the insured into a user interface of the loss reporting application 130 residing in the memory 122 of the insurer computing system 110. However, it should be appreciated that in some embodiments, the loss reporting application 130 resides in the memory of the computing device 104, and such embodiments may not include the insurer employee 108. In such embodiments, the user does not contact the insurer, but rather enters answers to the test data questions directly into the computing device 104. In yet another embodiment, the loss reporting application 130 resides in the insurer computing system 110 and is accessed by the customer 102 via a web server.

Generally, the insurer computing system 110 determines qualification/eligibility for the expedited total loss process described with respect to FIG. 1 based on the customer 102's set of answers via either an automated or manual process. In the automated process, data captured during FNOL (e.g., the customer's answers) are passed to a web service that leverages a predictive model and returns 1) a prediction of either 'Potential Total Loss' or 'Potential Repair' and 2) a confidence level associated with the above prediction. The set of answers and/or data returned from the web service is compared against business rule criteria to determine eligibility for the process. In the manual process, data captured during FNOL is reviewed by a person against business rule criteria to determine eligibility for the process. When an expedited total loss eligible vehicle is identified via either qualification process, claim assignment may be moved to a total loss claims specialist who in turn may proceed with ordering a vehicle evaluation and presenting a settlement offer to the customer. For example, the loss reporting application 130 may automatically generate a dollar value settlement based on a percentage of the ACV of the vehicle. Qualification and/or eligibility may be determined according to any suitable criteria, such as whether the claimant is an insured of the insurer, whether the vehicle is non-drivable, etc. In some cases, determining one or more eligibility criteria may include calls to external APIs (e.g., a call to a customer database to determine the identity/policy status of the customer 102). Criteria may include the party type as a third-party or first-party claimant as discussed below.

In response to the loss reporting application 130 receiving some or all of the set of answers, the loss reporting application 130 analyzes the set of answers to determine whether the vehicle that is the subject of the claim is eligible. When the loss reporting application 130 detects that the vehicle is eligible (e.g., the claimant is an insured, the loss is covered under the policy, and the vehicle is non-drivable), the loss reporting application 130 triggers an API call to the DVAM API 140. Drivability may be based on the presence and/or absence of one or more pieces of information in the set of answers. For example, a disabled engine may indicate non-drivability. However, it should be appreciated that in some embodiments, the DVAM API 140 will assess all vehicles, regardless of their drivability status.

The API call includes as parameters the set of answers provided by the customer 102. The DVAM API 140 submits the parameters to a DVAM system which analyzes the parameters using one or more trained ML model, and returns 1) a prediction of vehicle disposition (e.g., potential total loss or potential repair) and 2) a confidence level associated with the prediction of vehicle disposition. In some embodiments, the confidence level reflects a probability of total loss or repairability. Those of skill in the art will appreciate that the requests and responses discussed herein may be implemented using any suitable technology (e.g., HTTP GET/POST). After the loss reporting application 130 assesses drivability, the loss reporting application 130 submits the loss report to the claims management platform 132.

The claims management platform 132 triages the loss report. When the loss report includes an indication of total loss, the claims management platform 132 generates a settlement offer. When the loss report includes an indication of potential repair, the claims management platform 132 may generate a repair suggestion. The claims management platform 132 may transmit the settlement offer and/or repair suggestion to the customer 102 via the network 106. The repair suggestion may be personalized, including options based on the location of the vehicle, the vehicle year, the vehicle make and/or the vehicle model. However, it should be appreciated that in some embodiments, the customer 102 may select to opt out of a settlement. The loss reporting option 130 may include an opt out user interface element (not depicted) such as a checkbox, dropdown box, etc. that the customer 102 may select. When the vehicle is eligible for inspection as discussed above, the customer 102 may select the opt-out user interface element, which would cause the user's claim to be routed to a manual staff estimate process, or another estimatic tool.

Example DVAM System

FIG. 2 depicts an example computing environment 200, including a DVAM system 202. The DVAM system 202 may be implemented in a computing server, such as the insurer computing system 110 of FIG. 1, or another server having similar hardware and/or software components. A memory of the DVAM system 202 may include one or more modules, including a labeling module 204, a training module 206, and an operation module 208. The DVAM system 202 trains and operates one or more model capable of predicting whether a vehicle is repairable or a total loss at the time of FNOL. The model is trained, in part, based on ground truth labels of "repaired" or "total loss" with respect to vehicle data included in historical claims data.

The labeling module 204 may include computer-executable instructions for establishing ground truths with respect to ECS data stored in an ECS database 220. Specifically, the labeling module 204 may query the ECS database 220 to obtain a set of vehicle records including a respective set of cause of loss codes, a cause of loss status, a salvage disposition type code, and a salvage status code. The labeling module 204 may then label each vehicle as repairable or total loss, according to a rule. For example, a labeling rule may include the following criteria:

Cause of loss==open→unknown

Cause of loss==paid && salvage disposition type code !=null→total loss

Cause of loss==paid && salvage disposition type code==repaired→repaired

Cause of loss==paid && salvage disposition type code==opened in error→unknown

The labeling module 204 may generate labeled historical vehicle records, by labeling the ECS data. In some embodiments, the ECS data may include historical vehicle telematics data associated with one or more vehicle. The labeling module 204 may label the historical vehicle telematics data.

Empirical research has demonstrated that average time to disposition of vehicle claims (i.e., final repair/salvage decision) is approximately six months. Additionally, some claims are not disposed of due to various factors, such as lack of coverage, lack of liability, etc.

In some embodiments, the labeling module 204 may clean ECS data from the ECS database 220. For example, the labeling module 204 may retrieve records from the ECS database 220 in a comma-separated value (CSV) format. The retrieval steps may include reading an ECS header file, converting the headers to lowercase, writing the headers to a temporary ECS output file, reading the ECS data line-by-line, checking for the correct number of fields in each line, reading the temporary ECS output files into memory (e.g., as a Pandas DataFrame object), and replacing any missing ECS values.

The labeling module 204 may perform a vehicle identification number (VIN) decode. VIN decode is an important aspect of the training process, because VIN decode allows the labeling module 204 to determine whether a vehicle is eligible for the DVAM analysis. Specifically, data relating to vehicles such as motorcycles, large trucks and motorhomes may cause a large impact on model performance if they are included in the training data. For example, the "airbag deployed" and "door jammed" features are strong predictors that a vehicle is a total loss, especially for older vehicles. However, motorcycles will never have deployed airbags or jammed doors no matter how damaged they are. The labeling module 204 therefore includes logic for determining whether a vehicle is appropriate for the DVAM analysis by is to examining multiple fields in the VIN decode data. The VIN decode data is merged with the ECS data to create a final training dataset.

The labeling module 204 may store a record corresponding to each vehicle and the associated label as established by the above rules to the ECS database 220 or another database. Specifically, the training module 206 categorizes each vehicle as repairable, total loss, or unknown. The labeling module 204 determines if all causes of loss with respect to the vehicle are paid. If the vehicle is associated with an open cause of loss, then the vehicle is categorized as unknown.

The labeling module 204 categorizes all vehicles with all causes of loss as paid and salvage disposition type code not null as total loss, except: 1) a vehicle with salvage disposition type of repaired is categorized as repaired and 2) a vehicle with salvage disposition type code of opened in error is categorized as unknown.

Next, the training module 206 may train one or more ML model to output one of the labels based on analyzing information related to the vehicle.

Specifically, the training module 206 may analyze the test data questions discussed above with respect to each labeled vehicle. Specifically, the training module may analyze the age of the vehicle; the vehicle age squared; whether the vehicle rolled over; whether the vehicle was flooded; whether the vehicle was burned; whether the vehicle had wheel or suspension damage, whether the vehicle suffered a frontal impact; whether any of the vehicle's doors were jammed open or shut; whether the vehicle's engine was disabled; and whether any of the vehicle's airbags deployed. In some embodiments, the selection of input variables may be automated (e.g., by using recursive feature elimination). The data set analyzed by the training module 206 may include historical data retrieved/received from the ECS database 220, and as noted, may include telematics data with respect to vehicles.

In still further embodiments, the DVAM system 202 may incorporate several additional input variables to more accurately assess the probability of whether the vehicle will be classified as a total loss. For example, the DVAM system 202 may aggregate information from a variety of potential sources, including: loss reporting applications, claim history, total loss settlement history, telematics data, and vehicle damage classification inputs, etc. Additional sources may include, but are not limited to, loss reporting applications, policies, historical claims, VIN decode, ACV, total loss settlement history, telematics data, and/or vehicle damage classification input data, including both drivable vehicle data and non-drivable vehicle data.

Some of the input variables may be retrieved from other systems. For example, VIN decode information may be retrieved from the National Highway Traffic Safety Administration (NHTSA) Product Information Catalog and Vehicle Listing (vPIC) API. ACV may be retrieved from a vendor database for a respective vehicle.

The training module 206 may create a ML model that, when provided with an answer to each of the test data questions, generates one of the three labels (e.g., repairable, total loss, or unknown). In an embodiment, the ML model may include a regression (e.g., logistic regression) model and/or a classification model. The test data questions are input variables having a categorical value (e.g., "yes," "no," "unknown"). The regression model and/or classification model predicts a target variable (e.g., "repairable", "total loss"). As noted, other modeling techniques (e.g., Random Forest Trees) may be used instead of and/or in addition to regression, and several additional/different inputs may be incorporated to more accurately predict total losses. In an embodiment, many data elements (e.g., fifty or more) may be gathered during FNOL to increase predictability.

In some embodiments, additional and/or different techniques may be used to implement total loss identification techniques. For example, regression techniques other than logistic regression may be used (e.g., linear regression). Deep learning techniques may be used to implement the total loss identification. Moreover, different types of logistic regression may be used, such as binary logistic regression (e.g., to predict repairable/total loss) and multinomial logistic regression (e.g., to include a category of unknown). In further embodiments, a Random Forest Tree model and/or a Gradient Boosted Tree model may be used. Specifically, another model (e.g., a Gradient Boosted Tree model) may be substituted in place of a logistic regression model, trained as discussed with respect to a logistic regression model by the training module 206, and operated by the operation module 208.

It should be appreciated that the training module 206 and the operation module 208 may utilize data sets having a similar shape/format, that are retrieved/received from a similar origin (e.g., the ECS database 220). However, the data sets may include different data. For example, during training, the training module 206 may split data retrieved from the ECS database 220 and labeled by the labeling module 204 into a training and test data set according to a ratio (e.g., 60:40 training/testing data). The operation module 208 may receive data that is an identical format to the 60:40 training/testing data, but has distinct elements (e.g., values).

The training module 206 may include calling a fitting function, passing the training data as input. The fitting function may determine coefficients using a learning algorithm such as maximum-likelihood estimation. The training module 206 may serialize and/or store the trained ML model in the ECS database 220 or another database. Trained models may be loaded from the ECS database 220 into the memory of the DVAM system 202 by the operation module 208.

The operation module 208 may load/operate trained ML models, and output the result of operating the trained model on input data (e.g., data provided by a DVAM API). The operation module 208 may include a set of instructions for receiving API calls from one or more DVAM API, such as the DVAM API 140 depicted in FIG. 1. A model operated by the operation module 208 may output a detailed confidence level regarding the repairability of a vehicle involved in a loss.

If the model indicates that the vehicle is a total loss, then the DVAM system 202 may generate a recommendation that can be shared with the insurer computing system 110 or another loss reporting application to alert the customer 102 of the possibility of a total earlier in the process. If the model indicates that the vehicle is repairable, then the DVAM system 202 may provide repair options to the customer 104. In general, the DVAM system 202 allows highly confident total loss predictions to route to an expedited total loss process, providing savings in handling time, vehicle storage and reduction of line estimates creation.

In general, the design of the DVAM API and the DVAM system 202 is such that the model capabilities provided by the DVAM system 202 can be integrated into a variety of claims applications. As discussed with respect to FIG. 1, the DVAM API wraps the models provided by the DVAM system 202 and provides a request/response layer. The operation module 208 receives model inputs via an DVAM API linkage 230, and outputs of the model(s) operated by the operation module 208 are returned via the DVAM API linkage 230, as well as to an analytics environment 250.

The analytics environment 250 may analyze outputs of the model to improve the model. For example, a confusion matrix may be used to evaluate the performance of the trained ML model. In some embodiments, the analytics environment 250 may determine the precision of the trained ML model by determining the ratio of true positives to false positives. The analytics environment 250 may analyze historical claims in the ECS database 220 to infer the status of a prediction based on the location/transition of a vehicle and inspection data related to a vehicle. Locations may include a repair shop or a salvage yard, and a transition may refer to a vehicle's movement between two or more locations. A true positive (i.e., predicted total loss and a factual total loss) may be indicated by a vehicle receiving a single inspection at a salvage yard. A true negative (i.e., a predicted repairable vehicle and a factual repair) may be indicated by a single location at a repair shop. A false positive may be indicated by a vehicle's transition from a salvage yard to a repair shop (i.e., a predicted total loss and factual repairable), whereas a false negative may be indicated by a vehicle's transition from a repair shop to a salvage yard (i.e., a predicted repairable and factual total loss).

The inferred prediction status may be stored in the analytics environment 250 (e.g., in a Hadoop instance). A user may evaluate the inferred prediction status to improve the ML models, and for operational reporting in an analytics dashboard. The inferred prediction status information may be used for manual DVAM model validation. Once the predictive accuracy/precision is known, the results may be used to re-train the model. The DVAM system 202 is designed to allow additional data inputs to be added in an iterative fashion, to allow users to continually enhance and train the ML models to be more sophisticated in predicting when a vehicle is a total loss.

Exemplary Total Loss Method

Figure 3:
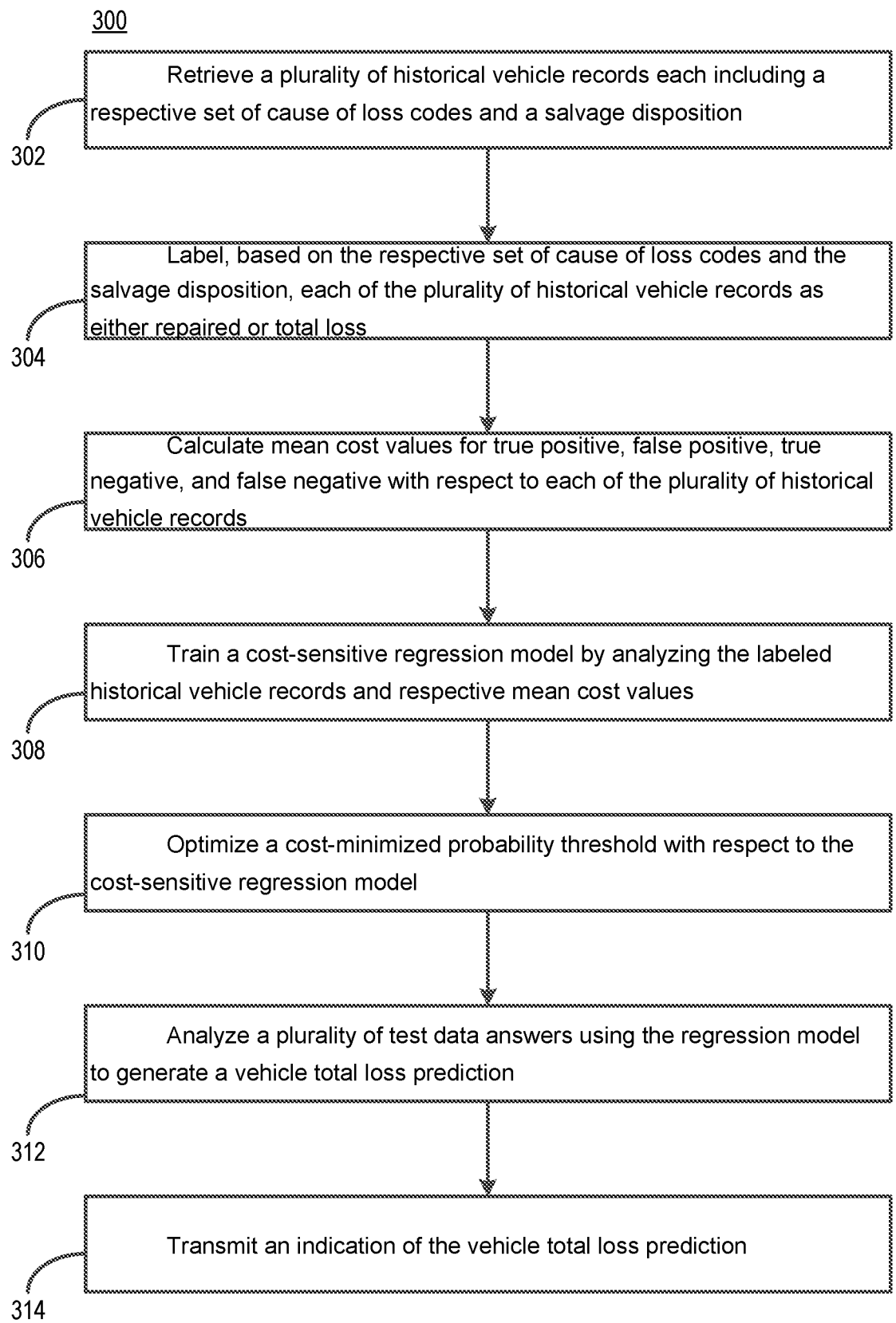
FIG. 3 depicts an example method for early identification of total loss vehicle claims.

FIG. 3 depicts an example vehicle total loss prediction method 300. Method 300 may include retrieving a plurality of historical vehicle records each including a respective set of cause of loss codes and a salvage disposition (block 302). In some embodiments, the method may be performed by the insurer computing system 100 of FIG. 1. In some embodiments, the DVAM system 202 of FIG. 2 may retrieve the historical vehicle claim records from the ECS database 220. The historical vehicle claim records may include cause of loss information such as ('331', '313', '311', '312', '390', '392', '394', '395', '396', '397', '400', '403', '404', '490', '494', '042'). The historical vehicle claim records may include cause of loss status, salvage disposition type code, and salvage status code. The training data may comprise several years' worth of data.

The method 300 may include labeling, based on the respective set of cause of loss codes and the salvage disposition, each of the plurality of historical vehicle records as either repaired or total loss (block 304). The labels may be referred to as ground truth labels. For example, to define the target the algorithm first determines if all causes of loss are "paid". If a vehicle has an open cause of loss it is marked "unknown." For those vehicles where all causes of loss are paid and the "salvage disposition type code" is not "null," the vehicle is marked "total loss." The exceptions to this are: 1. A vehicle with a "salvage disposition type code" of "repaired" is marked repaired. 2. A vehicle with a "salvage disposition type code of "opened in error" is marked "unknown." The algorithm marks total loss vehicles as "1", repairable vehicles as "0", and unknown vehicles are marked "−1". Once the data is labeled, the method 300 may write the final dataset output file in CSV and EEDF formats. The method 300 may transfer the final dataset to an edge server to provide team member access.

The method 300 may include calculating mean cost values for true positive, false positive, true negative, and false negative with respect to each of the plurality of historical vehicle records (block 306). The data used for calculating the cost of towing and storage may be retrieved from the ECS database 220, and may be organized into two parts: inspection data, and billing data. The inspection data contains all the locations where a vehicle was inspected during the claims process and the billing data has the claim storage and towing costs for each vehicle. The inspection data may be retrieved from one or more vehicle inspection tables and may include a timestamp and location. The location of the vehicle may be determined by the inspection location. The inspections may be organized sequentially using the inspection assignment date, and the inspection data may be categorized by analyzing inspection vendor names into salvage yard vs. repair facilities. If a name is not provided, a vehicle associated with the inspection may be dropped from the analysis.

Billing data may be retrieved wherein the bill type is for accident scene, secondary, and expense. The method may include performing a cost analysis based on payment causes of loss: '331', '313', '311', '312', '390', '392', '394', '395', '396', '397', '400', '403', '404', '490', '494', and '042'. The causes of loss used to calculate cost may mirror those used in determining total loss vs. repairable. The method 300 may filter billing data to only include payments for non-drivable insured vehicles. The method 300 may include creating unique location patterns for each vehicle by analyzing the location of each vehicle inspection. For example, as noted above, the following are typical location patterns:

Salvage yard (only one inspection, true positive)
Repair shop (true negative)
Salvage yard→Repair shop (false positive)
Repair shop→Salvage yard (false negative)

The method 300 may use billing data to determine the total storage and towing costs for each vehicle. Then, each vehicle's costs may be correlated to a claim identifier.

The method 300 may include averaging costs by pattern, resulting in a mean cost for each pattern. The patterns may be labeled true positives, true negatives, false positives, and false negatives.

The method 300 may include training a cost-sensitive binary classifier and/or regression model (e.g., logistic regression) by analyzing the labeled historical vehicle records and respective mean cost values, taking into account the relative costs of each of the four cases above (block 308). The method 300 may compute the costs of each case and outputs a cost dataset for further analysis. The method 300 may store the cost dataset in a file, including the claim identifier, the total tow and storage cost of the claim, and the ground truth label.

In some cases, the method 300 may include performing bootstrap error analysis to generate confidence intervals of the cost estimates. Generally, bootstrapping is the process of generating an equally sized random sample with replacement of a given dataset. For example, a number (e.g., 5000) sample datasets may be generated containing the true positive, false positive, true negative and false negative costs. The method 300 may generate mean, standard deviation, minimum, and maximum true positive, false positive, true negative, and false negative costs from each of the samples. The method may also include computing all combinations of the cost minimums, maximums, and means to build additional versions of the cost sensitive regression model, and generating distribution plots. The method 300 may include using the mean cost values as input for a Bayes minimum risk model described.

The method 300 may fit the regression model by performing one hot encoding of categorical variables, as well as instantiating and fitting a model pipeline that includes mean imputation, zero-mean-unit-width scaling, and three-fold cross validation to optimize the regularization parameter C.

As noted above, the method 300 may include serializing the fitted model and saving the serialized model to disk. The method 300 may also include writing output diagnostics regarding the performance of the fitted model.

An advantage of using a regression algorithm such as logistic regression over a tree-based method is that logistic regression outputs not only a binary decision but a probability associated with that decision. This probability can be used for thresholding. In the case of the DVAM model, thresholding may be motivated by the fact that inaccurately sending a vehicle to salvage does not have the same associated costs as inaccurately sending a vehicle to a repair shop. The method may include optimizing a cost-minimized probability threshold with respect to the cost-sensitive logistic regression model (block 310). Normally, logistic regression sets 0.5 as the probability threshold for classifying a record as positive (e.g., repairable vs. total loss). Here, the routing of vehicles to different locations is associated with different costs. Therefore, the method 300 may include biasing the classifier in favor of misclassifying a vehicle as repairable because the cost of a correct repairable classification is lower than a correct total loss classification. Therefore, the method 300 may increase the probability threshold for classifying a vehicle as total loss.

In particular, the method 300 may include the application of the following thresholding formula, to minimize cost rather than maximize accuracy:

$$\frac{C_{false\ positive} - C_{true\ negative}}{C_{false\ negative} - C_{true\ negative} - C_{true\ positive} + C_{false\ positive}}$$

The method may include analyzing a plurality of test data answers using the trained logistic regression model, to generate a vehicle total loss prediction (block 312). In some embodiments, generating the vehicle total loss prediction may be based on eligibility determined by analyzing the set of test data answers using predetermined criteria (e.g., whether the customer is a valid insured, whether the vehicle is non-drivable, etc.) As discussed above, many input variables may be analyzed. The output of the logistic regression model is a probability, which when thresholded, yields a cost-minimized categorical prediction vis-à-vis total loss. The method 300 may include transmitting an indication of the prediction (block 314). For example, a prediction of repair may be transmitted to the customer, with a personalized repair suggestion. For example, the method 300 may determine the location of a nearby affiliated repair shop, and recommend that the customer take the vehicle to the repair shop. When the prediction is total loss, the method 300 may include generating a settlement and transmitting/displaying the settlement to the customer's computing device.

Third-Party Total Loss Settlement Embodiment

In some embodiments, analyzing eligibility/qualification criteria for the early identification and settlement of total loss claims processes and procedures may include analyzing the identity of the customer/claimant to determine whether the customer/claimant is 1) an insured of a policy of the insurer and/or 2) whether the customer/claimant is filing a claim against a policy of an insured. For example, a first customer may be a vehicle policy holder of the insurer. A second customer may be a third-party (e.g., an insured of a different insurer, or an uninsured party). Continuing the example, the first customer and second customer may be involved in a vehicle collision. The first customer and/or second customer may contact the insurer to provide a FNOL, wherein the FNOL includes a first identification corresponding to the first customer and a second identification corresponding to the second customer. The techniques disclosed herein may include analyzing the first identification to determine whether the respective customer is an insured by, for example, querying a customer database. The techniques disclosed herein may include analyzing the second identification to determine whether the second customer is a claimant against a policy of an insured by, for example, analyzing a claims database to determine whether a policy and/or claim exists with which the first customer is associated.

With specific reference to FIG. 1, in some embodiments, the insurer computing system 110 may call the DVAM API 140 two times (or more), providing a set of answers with each call corresponding respectively to the first customer and the second customer. In this way, multiple respective outputs of a trained model may be used to determine a respective claim settlement. Continuing the example, the DVAM API 140 may return a respective DVAM prediction of total loss and respective probability with respect to a claim of the first customer and a claim of the second customer. For example, the API calls may return (TOTAL LOSS=1, PROBABILITY=0.9) and (TOTAL_LOSS=0, PROB=0.9). The insurer computing system 100 may pass the results of the DVAM API 140 with respect to the first customer and second customer to the claims management platform 132, which includes instructions for determining liability with respect to the first customer and the second customer and, based on the liability determination, generating a settlement with respect to the first customer and/or the second customer. In this example, the first customer may be offered a cash settlement, whereas the second customer may be offered a repair option. In this way, a claim involving two damaged vehicles of two respective claimants, wherein only one of the claimants is an insured of the insurer, may be automatically and expeditiously settled without an inspection of either vehicle.

Additional Advantages of the Present Techniques

The present techniques are less costly and faster than manual inspection-based total loss analyses currently used in the industry. Efficiencies gained by the present techniques better align with customer expectations and improve retention. The present techniques have increased accuracy and precision over existing methods, and increase claim cycle time. The present techniques may be regularly adjusted to account for new training data (e.g., daily or more frequently) and may be personalized to customer circumstances. The present techniques may be used to identify vehicles that are drivable total loss vehicles. The present techniques may provide customers with automated total loss updates throughout the claims process, and multiple models may be created and compared to analyze multi-factor optimizations.

ADDITIONAL CONSIDERATIONS

It should be appreciated that although the present techniques are described respect to vehicle total loss analysis, the modeling techniques disclosed herein may be implemented in solutions for resolving other types of claims, such as injury claims, weather and catastrophe claims. In resolving such claims, additional/other indicia may be analyzed. The techniques disclosed herein may be replicated elsewhere to drive further business efficiencies, and using similar models to address other business questions outside of total loss is envisioned.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

What is claimed is:

1. A computer-implemented method of analyzing vehicle damage, the method comprising:
   receiving a plurality of historical vehicle records including vehicle damage data and an associated vehicle damage state for a plurality of vehicles;
   training a regression model to output a predicted vehicle damage state, based at least in part on the plurality of historical vehicle records;
   determining, based at least in part on the historical vehicle records, a plurality of classification error cost values associated with the regression model, wherein the plurality of cost classification error values includes a first cost associated with a false positive classification error by the model, and a second cost associated with a false negative classification error by the model;
   modifying the regression model, based at least in part on the false positive classification error, the first cost, the false negative classification error, and the second cost, to generate a modified regression model; and
   transmitting the modified regression model to a computing system configured to output recommendations based on vehicle damage data, wherein the output of the computing system is based on execution of the modified regression model.

2. The computer-implemented method of claim 1, wherein each of the plurality of historical vehicle records includes a cause of loss code, a salvage disposition, and a vehicle identification number (VIN).

3. The computer-implemented method of claim 1, wherein:

determining the first cost associated with a false positive classification error by the model includes determining a cost of a salvage yard to repair shop transition of a vehicle, and determining the second cost associated with the false negative classification error includes determining a cost of a repair shop to salvage yard transition of the vehicle.

4. The computer-implemented method of claim 1, wherein determining the first cost associated with the false positive classification error and the second cost associated with the false negative classification error includes calculating a tow cost and a storage cost based at least in part on one or more of the plurality of historical vehicle records.

5. The computer-implemented method of claim 1, wherein determining the first cost associated with the false positive classification error and the second cost associated with the false negative classification error includes generating confidence intervals through bootstrapping error analysis.

6. The computer-implemented method of claim 1, further comprising:
determining a first eligible vehicle type;
determining a second ineligible vehicle type; and
determining a training set for training the regression model, wherein the training set includes a first historical vehicle record associated with the first eligible vehicle type, and excludes a second historical vehicle record associated with the second ineligible vehicle type.

7. The computer-implemented method of claim 1, wherein modifying the trained regression model comprises:
biasing a probability threshold associated with the predicted vehicle damage state, based at least in part on a true positive cost associated with the predicted vehicle damage state, the first cost associated with the false positive classification error, a true negative cost associated with the predicted vehicle damage state, and a second cost associated with the false negative classification error.

8. The computer-implemented method of claim 1, wherein modifying the trained regression model comprises:
retraining the trained regression model, based at least in part on the first cost and the second cost, wherein training the trained regression model comprises training the trained regression model to maximize the accuracy of the vehicle damage state prediction, and wherein retraining the modified trained regression model comprises retraining the modified trained regression model minimize the cost of the vehicle damage state prediction.

9. The computer-implemented method of claim 1, further comprising:
generating a Bayes minimum risk model based at least in part on the first cost and the second cost,
wherein modifying the trained regression model is based at least in part on the Bayes minimum risk model.

10. A system comprising:
one or more processors; and
one or more non-transitory computer-readable media storing computer-executable instructions that, when executed, cause the one or more processors to perform operations comprising:
receiving a plurality of historical vehicle records including vehicle damage data and an associated vehicle damage state for a plurality of vehicles;
training a regression model to output a predicted vehicle damage state, based at least in part on the plurality of historical vehicle records;
determining, based at least in part on the historical vehicle records, a plurality of classification error cost values associated with the regression model, wherein the plurality of cost classification error values includes a first cost associated with a false positive classification error by the model, and a second cost associated with a false negative classification error by the model;
modifying the regression model, based at least in part on the false positive classification error, the first cost, the false negative classification error, and the second cost, to generate a modified regression model; and
transmitting the modified regression model to a computing system configured to output recommendations based on vehicle damage data, wherein the output of the computing system is based on execution of the modified regression model.

11. The system of claim 10, wherein each of the plurality of historical vehicle records includes a cause of loss code, a salvage disposition, and a vehicle identification number (VIN).

12. The system of claim 10, wherein:
determining the first cost associated with a false positive classification error by the model includes determining a cost of a salvage yard to repair shop transition of a vehicle, and
determining the second cost associated with the false negative classification error includes determining a cost of a repair shop to salvage yard transition of the vehicle.

13. The system of claim 10, wherein determining the first cost associated with the false positive classification error and the second cost associated with the false negative classification error includes calculating a tow cost and a storage cost based at least in part on one or more of the plurality of historical vehicle records.

14. The system of claim 10, wherein determining the first cost associated with the false positive classification error and the second cost associated with the false negative classification error includes generating confidence intervals through bootstrapping error analysis.

15. The system of claim 10, the operations further comprising:
determining a first eligible vehicle type;
determining a second ineligible vehicle type; and
determining a training set for training the regression model, wherein the training set includes a first historical vehicle record associated with the first eligible vehicle type, and excludes a second historical vehicle record associated with the second ineligible vehicle type.

16. The system of claim 10, wherein modifying the trained regression model comprises:
biasing a probability threshold associated with the predicted vehicle damage state, based at least in part on a true positive cost associated with the predicted vehicle damage state, the first cost associated with the false positive classification error, a true negative cost associated with the predicted vehicle damage state, and a second cost associated with the false negative classification error.

17. The system of claim 10, wherein modifying the trained regression model comprises:

retraining the trained regression model, based at least in part on the first cost and the second cost, wherein training the trained regression model comprises training the trained regression model to maximize the accuracy of the vehicle damage state prediction, and wherein retraining the modified trained regression model comprises retraining the modified trained regression model minimize the cost of the vehicle damage state prediction.

18. The system of claim 10, the operations further comprising:
generating a Bayes minimum risk model based at least in part on the first cost and the second cost,
wherein modifying the trained regression model is based at least in part on the Bayes minimum risk model.

19. A non-transitory computer readable medium containing program instructions that when executed, cause a computer to:
receive a plurality of historical vehicle records including vehicle damage data and an associated vehicle damage state for a plurality of vehicles;
train a regression model to output a predicted vehicle damage state, based at least in part on the plurality of historical vehicle records;
determine, based at least in part on the historical vehicle records, a plurality of classification error cost values associated with the regression model, wherein the plurality of cost classification error values includes a first cost associated with a false positive classification error by the model, and a second cost associated with the false negative classification error by the model;
modify the regression model, based at least in part on the false positive classification error, the first cost, the false negative classification error, and the second cost, to generate a modified regression model; and
transmit the modified regression model to a computing system configured to output recommendations based on vehicle damage data, wherein the output of the computing system is based on execution of the modified regression model.

20. The non-transitory computer readable medium of claim 19, wherein modifying the trained regression model includes at least one of:
biasing a probability threshold associated with the predicted vehicle damage state, based at least in part on a true positive cost associated with the predicted vehicle damage state, the first cost associated with the false positive classification error, a true negative cost associated with the predicted vehicle damage state, and a second cost associated with the false negative classification error; or
retraining the trained regression model, based at least in part on the first cost and the second cost, wherein training the trained regression model comprises training the trained regression model to maximize the accuracy of the vehicle damage state prediction, and wherein retraining the modified trained regression model comprises retraining the modified trained regression model minimize the cost of the vehicle damage state prediction.

* * * * *